(12) United States Patent
Selogy et al.

(10) Patent No.: US 10,550,637 B2
(45) Date of Patent: Feb. 4, 2020

(54) OBSTRUCTION DETECTION SYSTEM FOR MOTORIZED WINDOW SHADES AND METHOD OF USE

(71) Applicants: Joseph Selogy, Gulf Breeze, FL (US); Ben Kutell, Coral Gables, FL (US); Brian Baisden, Pensacola, FL (US); Sean Scalf, Pensacola, FL (US); Curtis Scott, Milton, FL (US)

(72) Inventors: Joseph Selogy, Gulf Breeze, FL (US); Ben Kutell, Coral Gables, FL (US); Brian Baisden, Pensacola, FL (US); Sean Scalf, Pensacola, FL (US); Curtis Scott, Milton, FL (US)

(73) Assignee: THE WATT STOPPER, INC., Santa Clara, CA (US)

( * ) Notice: Subject to any disclaimer, the term of this patent is extended or adjusted under 35 U.S.C. 154(b) by 204 days.

(21) Appl. No.: 15/684,464

(22) Filed: Aug. 23, 2017

(65) Prior Publication Data

US 2018/0058143 A1 Mar. 1, 2018

Related U.S. Application Data

(60) Provisional application No. 62/378,865, filed on Aug. 24, 2016.

(51) Int. Cl.
*E06B 9/68* (2006.01)
*E06B 9/88* (2006.01)
(Continued)

(52) U.S. Cl.
CPC ............... *E06B 9/68* (2013.01); *E06B 9/262* (2013.01); *E06B 9/88* (2013.01); *E06B 9/28* (2013.01); *E06B 2009/6836* (2013.01)

(58) Field of Classification Search
CPC ..... E06B 9/68; E06B 9/70; E06B 9/72; E06B 9/322; E06B 9/262; E06B 9/88;
(Continued)

(56) References Cited

U.S. PATENT DOCUMENTS 4,902,953 A * 2/1990 Kraft ..................... E06B 9/32
160/DIG. 17
5,909,093 A * 6/1999 van Dinteren ............ E06B 9/32
318/16
(Continued)

OTHER PUBLICATIONS

Regan, et al, "Current Sense Circuit Collection", Dec. 2005, Linear Technology (Year: 2005).*

*Primary Examiner* — Katherine W Mitchell
*Assistant Examiner* — Abe Massad
(74) *Attorney, Agent, or Firm* — Christopher A. Proskey; BrownWinick Law Firm

(57) ABSTRACT

An obstruction detection system for motorized window shades is presented having a motor, shade material, a bottom bar, and a motor controller having a microprocessor. The microprocessor is configured to detect when an obstruction has been encountered when closing the motorized window shades. When an obstruction is detected, the microprocessor stops lowering the shade material and the bottom bar thereby preventing further damage or destruction. The system may also be used to report when an unexpected obstruction has been detected.

17 Claims, 14 Drawing Sheets

(51) Int. Cl.
*E06B 9/262* (2006.01)
*E06B 9/28* (2006.01)

(58) Field of Classification Search
CPC ...... E06B 9/30; E06B 9/28; E06B 2009/2627; E06B 2009/3222; E06B 2009/6836; E06B 2009/6845; E06B 2009/6854
See application file for complete search history.

(56) References Cited

U.S. PATENT DOCUMENTS

| | | | |
|---|---|---|---|
| 6,486,631 B2 * | 11/2002 | Schlecht | G05B 19/4062 160/310 |
| 7,923,948 B2 * | 4/2011 | Rodas | E06B 9/322 318/266 |
| 8,065,039 B2 * | 11/2011 | Mullet | E06B 9/68 318/467 |
| 2004/0239269 A1 * | 12/2004 | Fitzgibbon | E06B 9/88 318/366 |
| 2014/0224437 A1 * | 8/2014 | Colson | E06B 9/42 160/291 |
| 2015/0275574 A1 * | 10/2015 | Derk, Jr. | E06B 9/50 160/1 |

* cited by examiner

OBSTRUCTION DETECTION SYSTEM FOR MOTORIZED WINDOW SHADES AND METHOD OF USE

CROSS-REFERENCE TO RELATED APPLICATIONS

The present application claims the benefit of U.S. Provisional Patent Application Ser. No. 62/378,865, filed Aug. 24, 2016, which is hereby incorporated by reference herein in its entirety, including any figures, tables, or drawings.

FIELD OF THE DISCLOSURE

This disclosure relates generally to motorized window shades. More specifically, and without limitation, this disclosure relates to an obstruction detection system for motorized window shades and a method of use thereof.

BACKGROUND OF DISCLOSURE

Motorized window shades are old and well known in the art. There are countless forms of motorized window shades. A number of entities manufacture various motorized window shades including applicant, QMotion Advanced Shading Systems, having an address of 3400 Copter Road, Pensacola, Fla. 32514, as well as others such as Lutron Electronics, Inc., having an address of 7200 Suter Road, Coopersburg, Pa. 18036-1299; HunterDouglas, having an address of 1 Blue Hill Plaza, Pearl River, N.Y. 10965; MechoSystems, having an address of 42-03 35th Street, Long Island City, N.Y. 11101; Somfy Systems, having an address of 121 Herrod Blvd, Dayton, N.J. 08810; Crestron, having an address of 15 Volvo Drive, Rockleigh, N.J. 07647, to name a few.

As will be further described herein, there are a number of common motorized window shade configurations. Broad categories of motorized window shade configurations include: roller shades, honeycomb shades, slat shades (also known as venetian shades), roman shades, drapery rods, and drapery tracks, to name a few. These motorized window shade configurations can be separated into laterally opening motorized window shades, where the shade material moves laterally from side-to-side to cover and uncover the window, and vertically opening motorized window shades, where the shade material is raised and lowered to cover and uncover the window.

Motorizing window shades provides a great number of substantial advantages such as convenience, energy efficiency, increased privacy, among countless others. By motorizing window shades this allows for remote operation of the window shade. Common forms of remote operation of motorized shades include use of a remote control or remote application or tying the motorized shade into a home automation system or alarm system.

Motorizing window shades allows a plurality of shades to be raised and lowered with ease thereby allowing for easy optimization of the use of natural light, optimization of privacy, and optimization of energy efficiency by letting warming light into the building when it is cold outside and preventing warming light from entering the building when it is warm outside. These benefits are particularly evident in large homes or commercial buildings that include a great number of windows and window shades. Motorizing these window shades allows for these motorized window shades to be precisely controlled, en masse, without the manual labor previously required to do so.

Providing the ability to remotely control a motorized window shade removes the requirement that an operator must be standing next to the window shade while it is operating. One complication caused by this is that when a motorized window shade is operated remotely, and there is no one around to observe the window shades operation, various issues can arise.

One issue that can arise during the unobserved operation of motorized window shades occurs when an obstruction is positioned in the path of vertically opening and closing motorized window shades. When an obstruction is present in the opening and closing path of a motorized window shade and the motorized window shade is operated, damage can occur to the components of the motorized window shade, to the shade material or to the obstructing objects or surrounding environment of the motorized window shade.

For vertically opening motorized window shades, it is relatively easy to detect when an obstruction is present that prevents the motorized window shade from being raised. This is because there is a substantial spike in current draw of the motor which may prevent the shade material from being raised. This occurs when something heavy is placed on the shade material or bottom bar, or when the bottom bar or shade material is pinched in a door, a window, or behind a piece of furniture, or the like. This substantial spike in current draw of the motor is easy to detect due to the great magnitude of the current spike and the rapidity at which it spikes and due to the fact that the obstruction often stops the shade material or bottom bar from being raised.

In contrast, when an obstruction is present in the closing path of a motorized window shade, it is relatively difficult or impossible to detect because the shade material or bottom bar is not stopped from deploying when the obstruction is encountered. In addition, very little energy is required to lower a motorized window shade, as opposed to raise the same motorized window shade and therefore there is no pronounced spike in the current draw when the obstruction is encountered. Complicating matters further, when an obstruction is present when closing a vertically operating motorized window shade and the bottom bar encounters the obstruction, the shade material continues to be paid out (e.g. unrolled from the roller shade, or lowered from the head rail for honeycomb, venetian and roman shades). That is, when an obstruction is present when the shade material is lowered, there is nothing stopping the motorized shade from continuing to lower the shade material and the bottom bar (this is opposed to when an obstruction is present in the opening direction as the obstruction has the tendency to prevent raising of the bottom bar and shade material).

Continuing to deploy shade material after an obstruction has been encountered has the potential to cause substantial damage. As an example, as the shade material lowers, it can billow, fold and drape over the obstruction. This can cause damage to the shade material, such as fold lines, wrinkles, lines or wear marks and soiling, to name a few. This can also cause damage to the object that is causing the obstruction, such as tipping over the vase filled with water and flowers, knocking over pictures or other objects, and the like. This can also cause damage to the surrounding environment, such as spilling water on the floor, knocking heavy objects onto the floor thereby causing damage to the floor, and the like.

Due to the complexities of detecting an obstruction upon closing of vertically opening and closing motorized window shades, there is presently no solution preventing the shade material from being completely paid out after an obstruction is engaged when closing the shade material.

Thus, an object of the disclosure is to provide an obstruction detection system for motorized window shades that improves upon the present state of the art.

Another object of the disclosure is to provide an obstruction detection system for motorized window shades that protects the shade material.

Yet another object of the disclosure is to provide an obstruction detection system for motorized window shades that improves safety.

Another object of the disclosure is to provide an obstruction detection system for motorized window shades that prevents damage to the environment surrounding the motorized window shades.

Yet another object of the disclosure is to provide an obstruction detection system for motorized window shades that improves the use of motorized window shades.

Another object of the disclosure is to provide an obstruction detection system for motorized window shades that extends the useful life of motorized window shades.

Yet another object of the disclosure is to provide an obstruction detection system for motorized window shades that is easy to use.

Another object of the disclosure is to provide an obstruction detection system for motorized window shades that is safe to use.

Yet another object of the disclosure is to provide an obstruction detection system for motorized window shades that is inexpensive.

Another object of the disclosure is to provide an obstruction detection system for motorized window shades that improves the functionality of motorized window shades.

Yet another object of the disclosure is to provide an obstruction detection system for motorized window shades that is convenient to use.

Another object of the disclosure is to provide an obstruction detection system for motorized window shades that is easy to install.

Yet another object of the disclosure is to provide an obstruction detection system for motorized window shades that does not require additional exterior parts.

Another object of the disclosure is to provide an obstruction detection system for motorized window shades that is energy efficient.

Yet another object of the disclosure is to provide an obstruction detection system for motorized window shades that has a simple design.

Another object of the disclosure is to provide an obstruction detection system for motorized window shades that has a minimum number of parts.

Yet another object of the disclosure is to provide an obstruction detection system for motorized window shades that has a rugged design.

Another object of the disclosure is to provide an obstruction detection system for motorized window shades that is relatively foolproof.

Yet another object of the disclosure is to provide an obstruction detection system for motorized window shades that is sensitive.

Another object of the disclosure is to provide an obstruction detection system for motorized window shades that has an intuitive design.

Yet another object of the disclosure is to provide an obstruction detection system for motorized window shades that can be connected to a security system or home automation system.

Another object of the disclosure is to provide an obstruction detection system for motorized window shades that can be utilized in two-way communication to report an obstruction.

These and countless other objects, features, or advantages of the disclosure will become apparent from the specification and claims.

SUMMARY OF THE DISCLOSURE

An obstruction detection system for motorized window shades is presented having a motor and a motor controller having a microprocessor. The microprocessor is configured to detect when an obstruction has been encountered when closing the motorized window shade. When an obstruction is detected, the microprocessor stops lowering the bottom bar of the motorized window shade thereby preventing further damage or destruction. The system may also be used to report when an unexpected obstruction has been detected.

DETAILED DESCRIPTION OF THE DISCLOSURE

Figure 1:
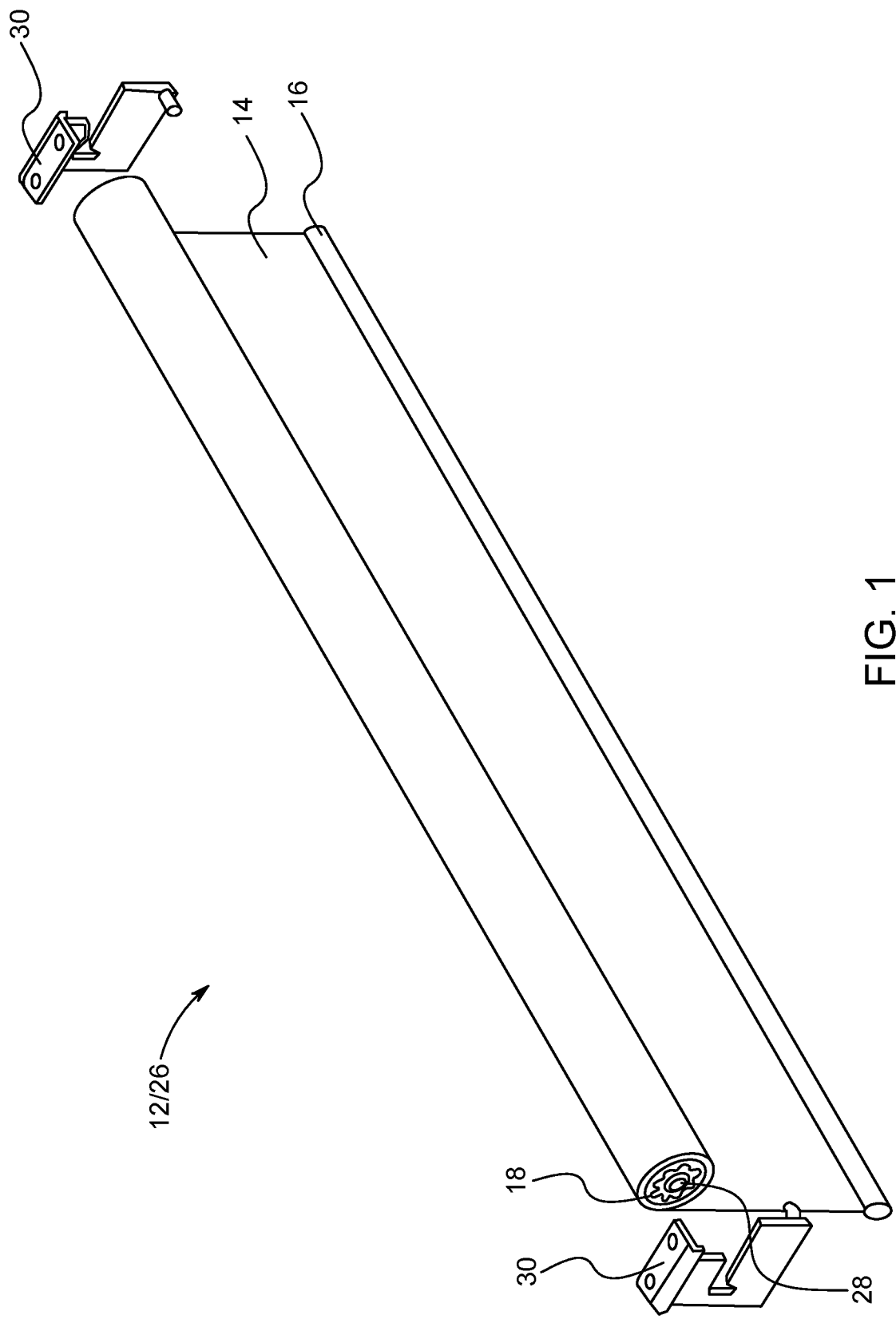
FIG. 1 is a side perspective view of one common form of a motorized window shade known as a motorized roller shade.
Figure 2:
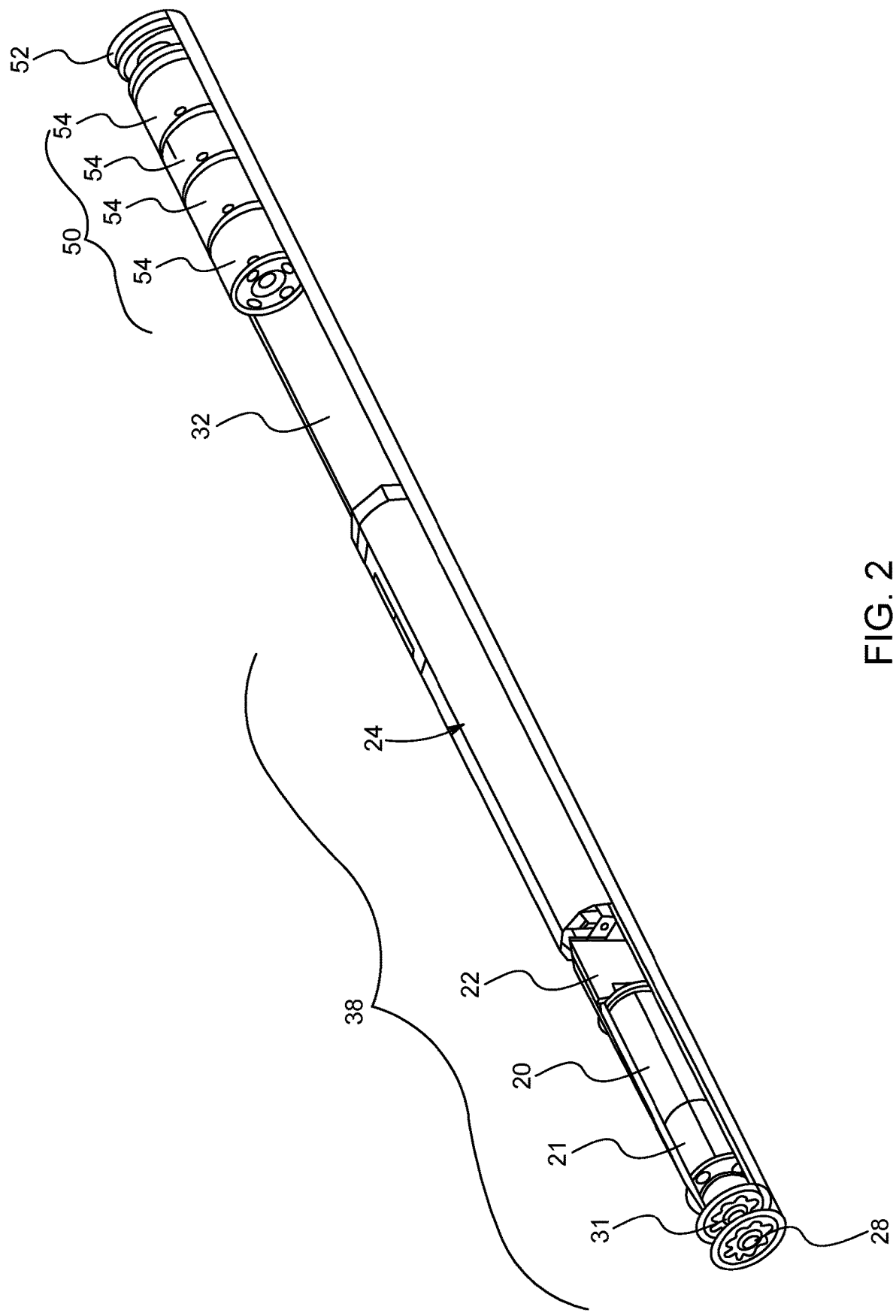
FIG. 2 is a side perspective view of a motor controller assembly as utilized in one common form of a motorized window shade, a motorized roller shade.
Figure 3:
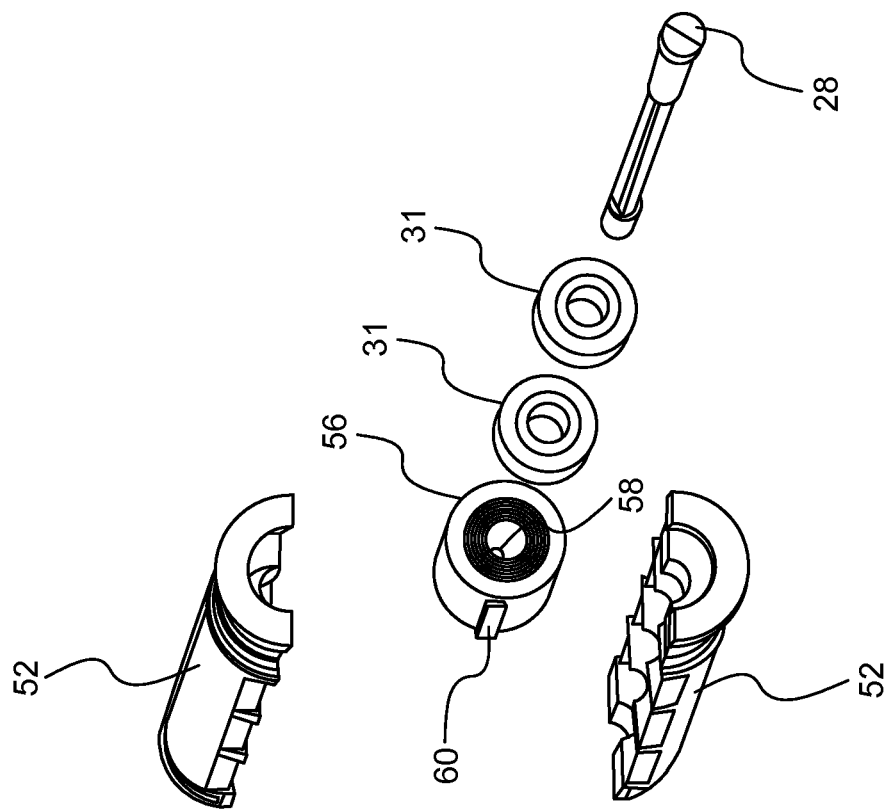
FIG. 3 is a side perspective view of a support, housing, spring housing as utilized in one common form of a motorized window shade, a motorized roller shade.
Figure 3:
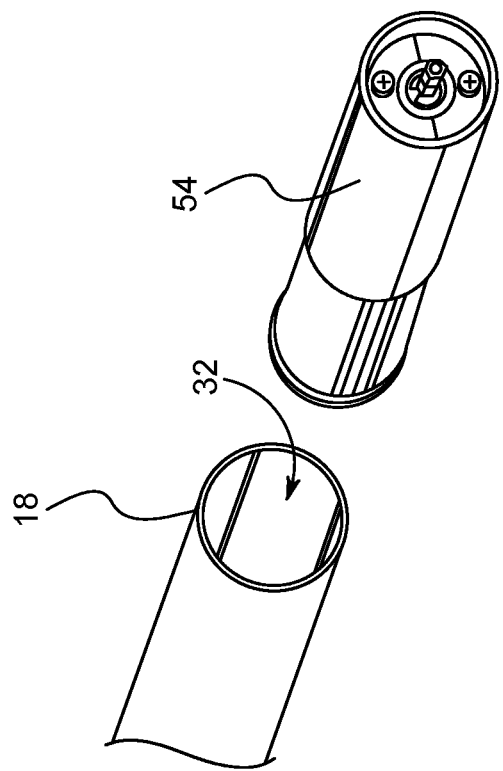

In the following detailed description, reference is made to the accompanying drawings which form a part hereof, and in which is shown by way of illustration specific embodiments in which the invention may be practiced. These embodiments are described in sufficient detail to enable those skilled in the art to practice the disclosure, and it is to be understood that other embodiments may be utilized and that mechanical, procedural, and other changes may be made without departing from the spirit and scope of the disclosure(s). The following detailed description is, therefore, not to be taken in a limiting sense, and the scope of the invention is defined only by the appended claims, along with the full scope of equivalents to which such claims are entitled.

As used herein, the terminology such as vertical, horizontal, top, bottom, front, back, end and sides are referenced according to the views presented. It should be understood, however, that the terms are used only for purposes of description, and are not intended to be used as limitations. Accordingly, orientation of an object or a combination of objects may change without departing from the scope of the disclosure.

In addition, while the system presented herein is shown and described primarily with reference to vertically opening and closing motorized window shades, the system is not limited to use with vertically opening and closing motorized window shades, nor is the system limited to use with motorized window shades. Instead, primary reference to vertically opening motorized window shades is simply as one of many examples of the system's use. While the system is well suited to vertically opening motorized window shades, it is hereby contemplated that the system can be used with any type of a motorized opening and closing device.

With reference to the Figures, an obstruction detection system for motorized window shades and method of use is presented with reference to reference numeral 10 (system 10). The system 10 is formed of any suitable size, shape, design and configuration. In one arrangement, as is shown, the system 10 includes one or more of motorized window shades 12.

Motorized Window Shade: Motorized window shade(s) 12 are formed of any suitable size, shape and design. Common components of motorized window shades 12 include shade material 14 which is connected to a bottom bar 16 at its lower end and is connected to a support 18 at its upper end. Other common components of motorized window shades 12 include a motor 20, a gear assembly 21, a motor controller 22 connected to the motor 20 and configured to control the motor 20 and a power source 24 electrically connected to the motor 20 and the motor controller 22.

Roller Shades: With reference to FIGS. 1-5, one common form of motorized window shades 12 are known as motorized roller shades 26. Motorized roller shades 26 are formed of any suitable size, shape and design and are configured to roll and unroll the shade material 14 around a support 18 which takes the form of an elongated hollow roller tube. Shade material 14 generally takes the form of a single layer or sheet of fabric for most roller shade applications.

As one example, in the arrangement shown in FIGS. 1-5, roller tube/support 18 includes an axle 28 that extends outward from the outward ends 30 of the roller tube/support 18 which serve as the axis of rotation for the roller tube/support 18. Axles 28 connect to bearings which facilitate rotation of the roller tube/support 18 upon axles 28. Axles 28 connect to brackets 30 which hold the axles 28 stationary as the roller tube/support 18 rotates thereby raising or lowering the shade material 14.

As one example, in the arrangement shown in FIGS. 1-5, motor 20 and motor controller 22 of motorized roller shade 26 are positioned within the hollow interior 32 of roller tube/support 18. Also, in the arrangement shown, the power source 24 takes the form of a battery tube 34 that is configured to house a plurality of batteries 36 therein. In one arrangement the motor 20, gear assembly 21, motor controller 22, battery tube 34, batteries 36 and one axle 28 are configured as a single self-contained motor controller assembly 38.

Figure 4:
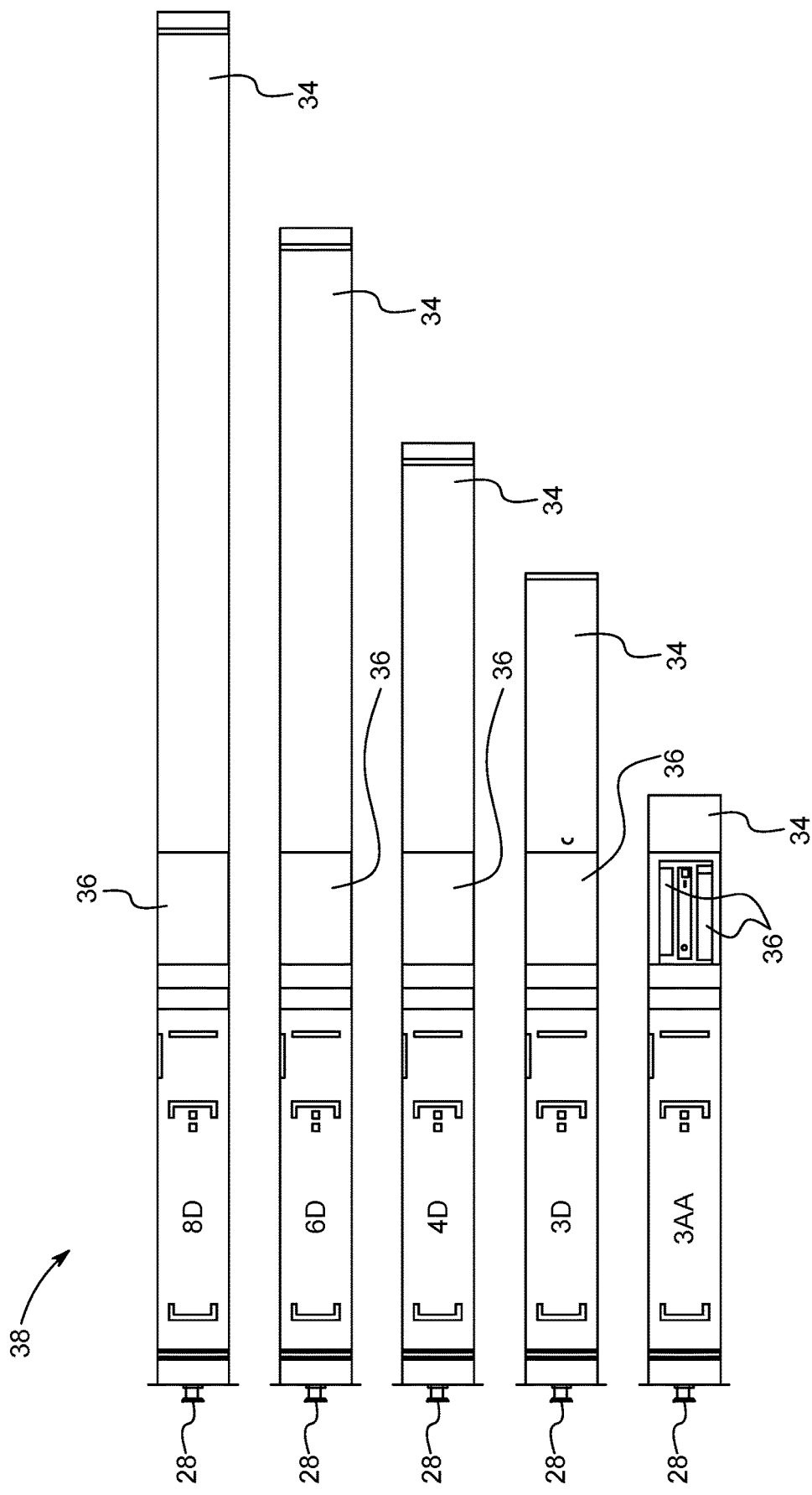
FIG. 4 is a side view of a motor controller assembly as utilized in one common form of a motorized window shade, a motorized roller shade, which demonstrates that motor controller assemblies may be formed to contain any size and number of batteries.

With reference to FIG. 4, motor controller assemblies 38 may be formed to contain any size and number of batteries 36. Shown examples include a motor controller assembly 38 having a battery tube 34 that contains 8D cell batteries 36, a motor controller assembly 38 having a battery tube 34 that contains 6D cell batteries 36, a motor controller assembly 38 having a battery tube 34 that contains 4D cell batteries 36, a motor controller assembly 38 having a battery tube 34 that contains 3D cell batteries 36, a motor controller assembly 38 having a battery tube 34 that contains 3 or 4 AA cell batteries 36. Any other combination or number of batteries is hereby contemplated for use.

Figure 5:
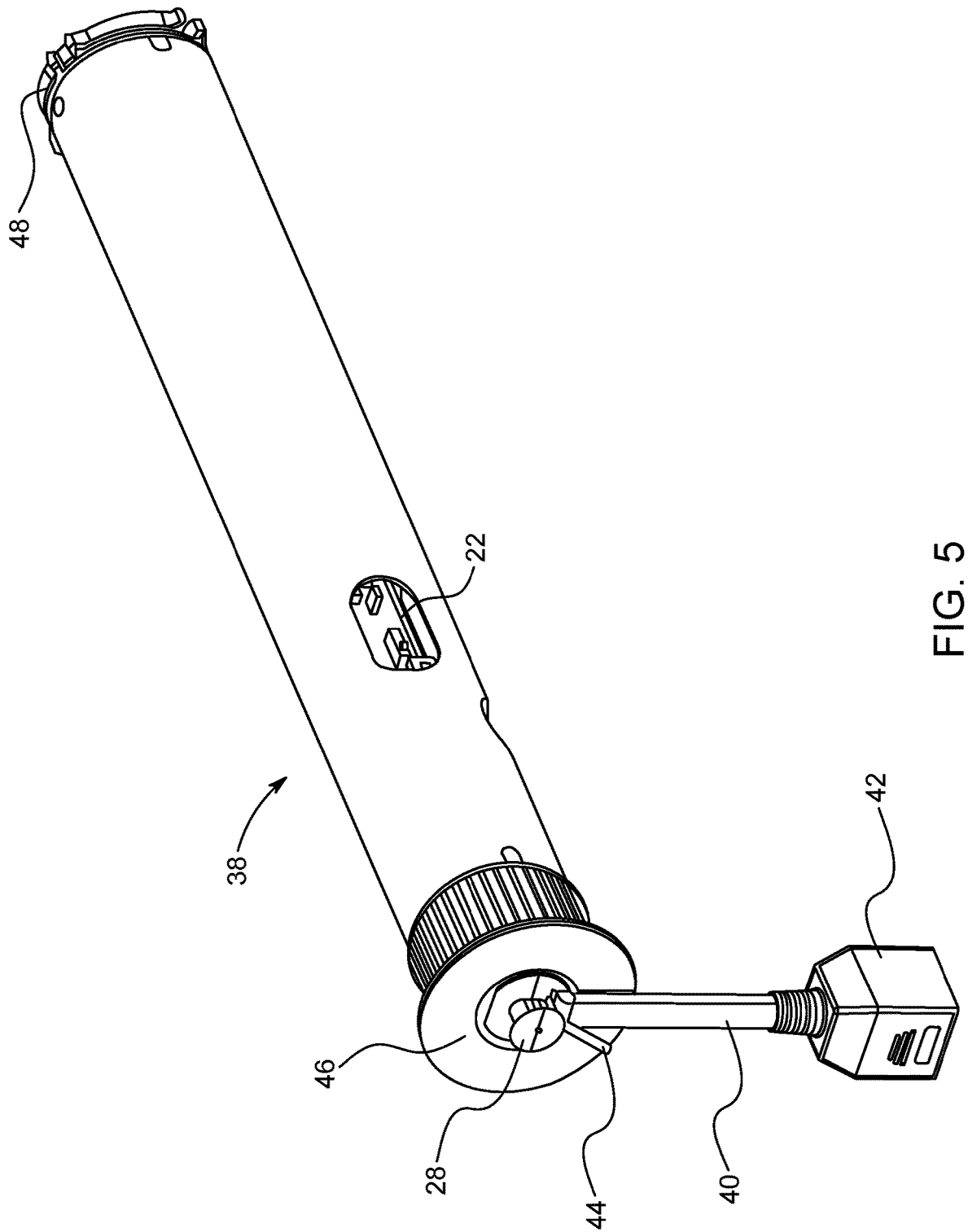
FIG. 5 is a side perspective view of a hard-wired motor controller assembly as utilized in one common form of a motorized window shade, a motor roller shade.

In an alternative arrangement, with reference to FIG. 5, a hard-wired motor controller assembly 38 is provided. In this arrangement, the battery tube 34 and batteries 36 are absent, and instead the motor 20 and motor controller 22 are powered by an external power source such as line-power, an external battery or battery pack, a solar cell, or the like or any combination thereof. In the arrangement shown, a lead 40 extends outward from the end of motor controller assembly 38 and connects to a socket 42. Lead 40 is any form of a wire, or plurality of wires such as a conventional two-wire system, a three-wire system, an Ethernet cable, or any other wire that is configured to power or power and control motor 20. Also in the arrangement shown, an antenna 44 extends outward from an end cap 46 that covers the end of the motor controller assembly 38 and surrounds the axle 28.

Also in the arrangement shown, a drive wheel 48 is connected to the inward end of the motor controller assembly 38. Drive wheel 48 is connected to motor 20 and is configured to rotate upon operation of motor 20 thereby rotating roller tube/support 18.

Also in the arrangement shown, a counterbalance assembly 50 is positioned in an end of the hollow interior 32 of roller tube/support 18 opposite the end the motor controller assembly 38 is positioned in. Counterbalance assembly 50 is formed of any suitable size, shape and design and is configured to provide a counterbalance force to the weight of the shade material 14 and bottom bar 16. The counterbalance force provided by counterbalance assembly 50 helps to compensate for the weight of the shade material 14 and bottom bar 16 and thereby reduces the force and energy required to raise and lower the shade material 14 and bottom bar 16. The counterbalance force provided by counterbalance assembly 50 also helps to maintain a set position of the shade material 14 and bottom bar 16 by compensating for the weight of the shade material 14 and bottom bar 16.

In the arrangement shown, counterbalance assembly 50 includes an axle 28 connected to a pair of bearings 31 that facilitate rotation of roller tube/support 18. Counterbalance assembly also includes a housing 52 that holds axle 28 and bearings 31 and connects to one or more spring housings 54 that house one or more springs 56. In the arrangement shown, a power spring (also known as a clock spring or ribbon spring) is used which is wrapped around itself in circular fashion between an interior end 58 and an exterior end 60. As the roller tube/support 18, one end 58/60 is held stationary while the other end 58/60 rotates with the roller tube/support 18 thereby generating a counterbalance force that compensates for the weight of the shade material 14 and bottom bar 16.

In Operation: When motor 20 is activated by motor controller 22, motor 20 causes rotation of roller tube/support 18. When roller tube/support 18 is rotated in a first direction, shade material 14 and bottom bar 16 are raised as the shade material 14 wraps around the roller tube/support 18. When roller tube/support 18 is rotated in a second direction, opposite the first direction, shade material 14 and bottom bar 16 are lowered as the shade material 14 unwraps wraps around the roller tube/support 18.

Figure 6:
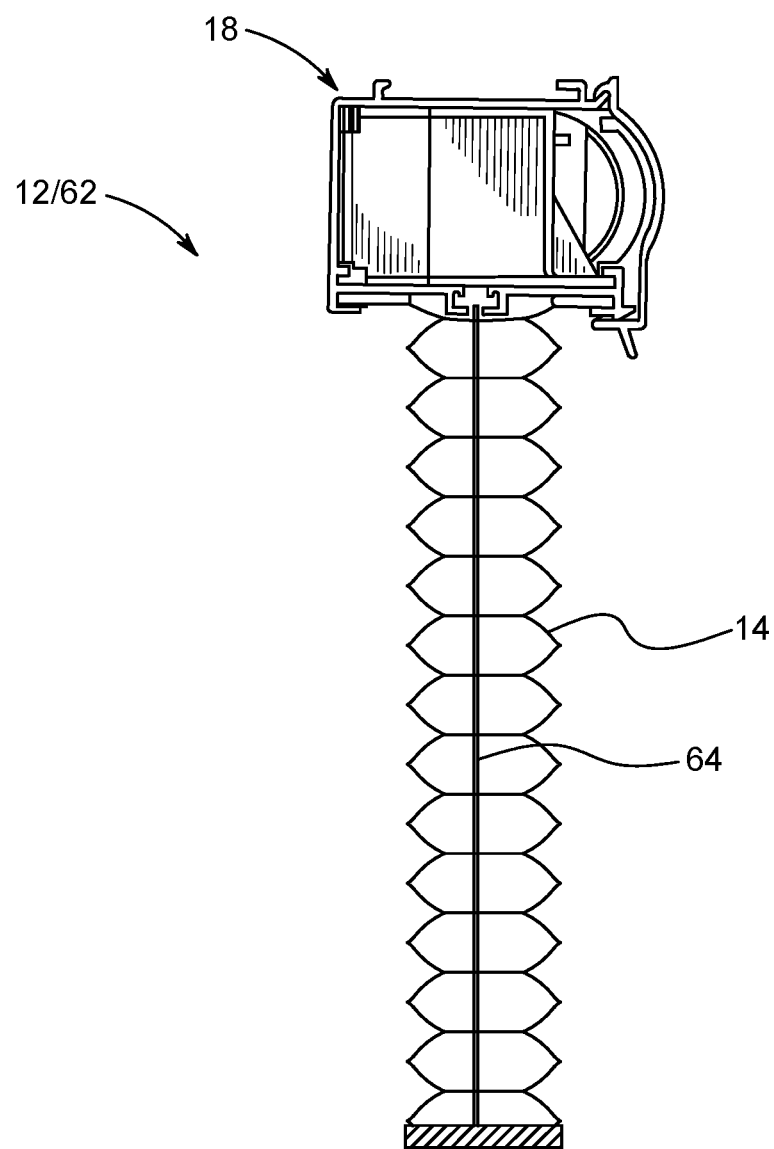
FIG. 6 is a side perspective view of one common form of a motorized window shade, a motorized honeycomb shade.
Figure 7:
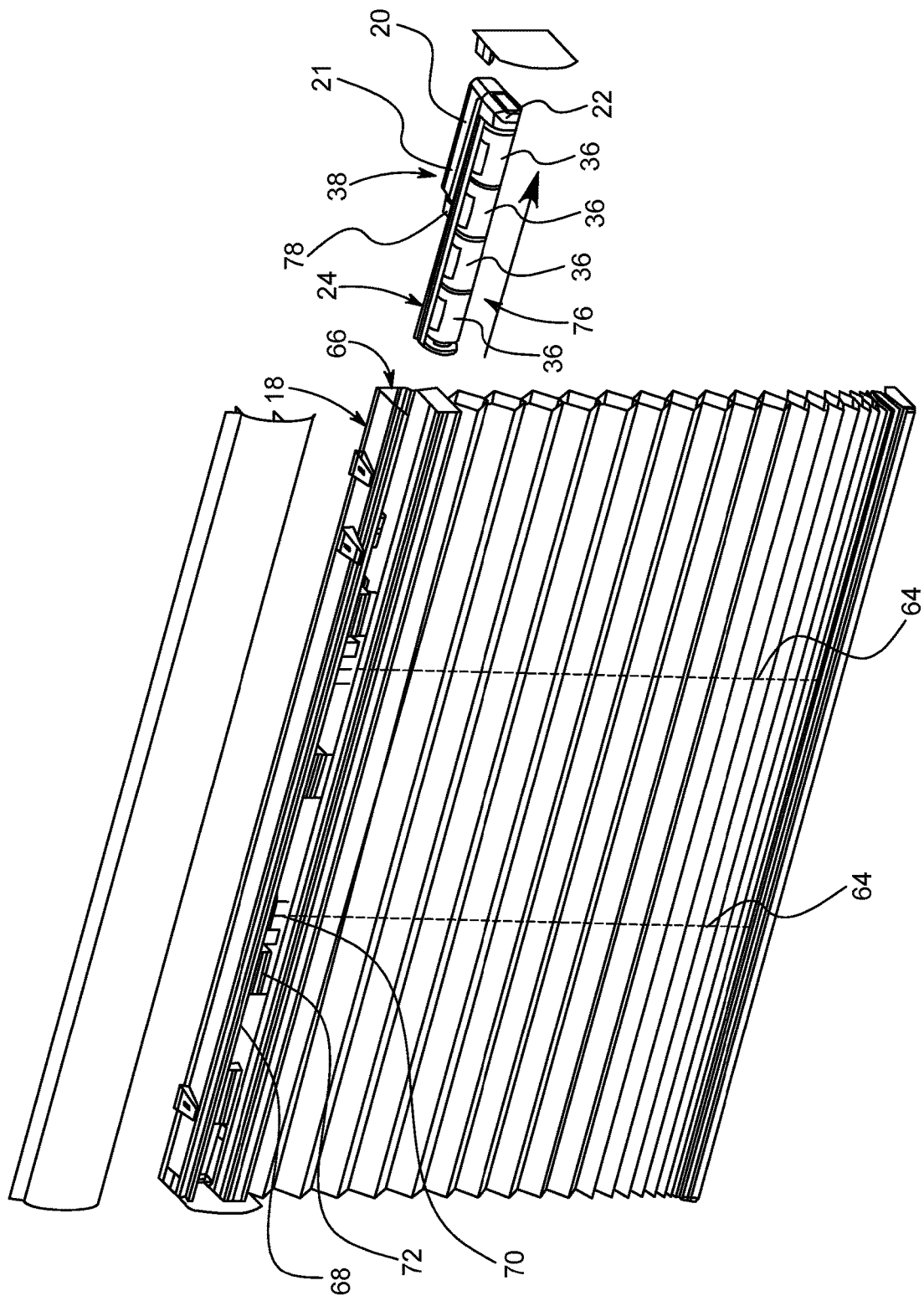
FIG. 7 is a front perspective view of one common form of a motorized window shade, a motorized honeycomb shade.

Honeycomb Shades: With reference to FIGS. 6-7, one common form of motorized window shades 12 are known as motorized honeycomb shades 62. Motorized honeycomb shades 62 are formed of any suitable size, shape and design and are configured to raise and lower the shade material 14 by deploying and retracting suspension cords 64 that extend through the shade material 14 and connect to bottom bar 16. For honeycomb shades 62 shade material 14 generally takes the form of a pleated or accordion or, for lack of a better term, honeycomb style or shaped design that forms a plurality of cells that can vertically expand or collapse when raised or lowered.

As one example, in the arrangement shown in FIGS. 6-7, support 18 takes the form of an elongated headrail having a hollow interior 66 that houses a rotatable drive shaft 68 that is connected to a plurality of suspension cord spools 70 and spring housings 72 that house springs 74. As the drive shaft 68 rotates, so rotates the springs 74 within the spring housings 72 which generate a counterbalance force that counters the weight of the shade material 14 and bottom bar 16. As the drive shaft 68 rotates, so rotates the suspension cord spools 70, thereby raising or lowering the shade material 14 and bottom bar 16.

As one example, in the arrangement shown in FIGS. 1-5, motor 20 and motor controller 22 of motorized honeycomb shade 62 are positioned within the hollow interior 66 of headrail/support 18 and are housed within or as part of motor controller assembly 38. Also, in the arrangement shown, the power source 24 takes the form of a plurality of batteries 36 held by a battery holding section 76 of motor controller assembly 38.

With reference to FIG. 7, motor controller assembly 38 may be formed to contain any size and number of batteries 36. Shown as one example is a motor controller assembly 38 is configured to hold four D cell batteries, however any other battery configuration is hereby contemplated for use as is the use of any number of batteries.

Notably, in the arrangement shown, the batteries 36 are positioned forward of the motor 20 and gear assembly 21. This positioning reduces the required vertical height of headrail/support 18 and improves aesthetics.

Also in the arrangement shown, a drive wheel 78 is connected to the inward end of the motor controller assembly 38. Drive wheel 78 is connected to motor 20 and is configured to rotate upon operation of motor 20. Drive wheel 78 is configured to engage an outward end of drive shaft 68. As the motor 20 rotates, so rotates the drive wheel 78 which transmits torque and rotation to drive shaft 68. As the drive shaft 68 rotates, so rotates the suspension cord spools 70, thereby raising or lowering the suspension cords 64 thereby raising or lowering the shade material 14 and bottom bar 16.

Drive shaft 68 extends through the springs 74 of spring housings 72 which are positioned along the length of drive shaft 68. As the shade material 14 and bottom bar 16 are raised or lowered, the rotation of drive shaft 68 causes one end of springs 74 to wrap around or unwrap from drive shaft 68. This wrapping or unwrapping of springs 74 generates a counterbalance force that counters the weight of the shade material 14 and bottom bar 16. One complexity to raising and lowering motorized honeycomb shades 62 is that the torque profile of the shade material 14 changes between the fully raised position and a fully closed position. This is because as the shade material 14 is raised, more and more of the shade material 14 is being supported by the suspension cords 64. As such, the weight on the suspension cords 64 gets heavier and heavier as the shade is raised higher. In contrast, the weight on the suspension cords 64 gets lighter and lighter as the shade is lowered. To counterbalance this dynamic force, springs 74 are configured to have varying torque profiles such that the combined torque profile of the springs 74 matches or closely approximates the varying weight of the shade material 14 across the spectrum of open and closed positions.

In Operation: When motor 20 is activated by motor controller 22, motor 20 causes rotation of drive shaft 68. When drive shaft 68 is rotated in a first direction, shade material 14 and bottom bar 16 are raised as the suspension cords 64 wrap around the suspension cord spools 70, and the springs 74 provide a counterbalance force that compensates for the varying weight of the shade material 14 on suspension cords 64. When drive shaft 68 is rotated in a second direction, opposite the first direction, shade material 14 and bottom bar 16 are lowered as the suspension cords 64 unwrap around the suspension cord spools 70, and the springs 74 provide a counterbalance force that compensates for the varying weight of the shade material 14 on suspension cords 64.

Figure 8:
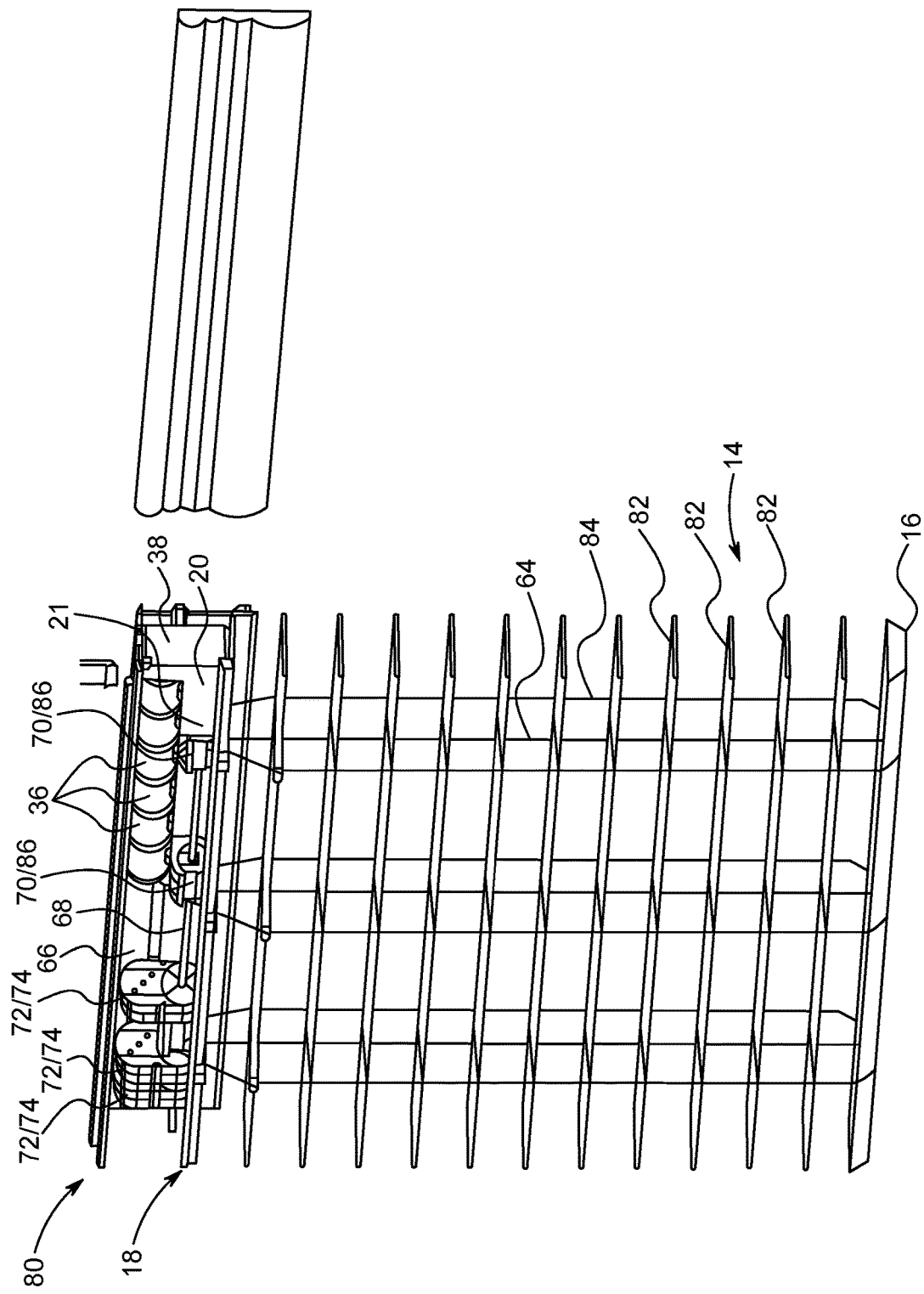
FIG. 8 is a front perspective view of one common form of a motorized window shade, a motorized Venetian shade.

Motorized Venetian Shades: With reference to FIG. 8, one common form of motorized window shades 12 are known as motorized Venetian shades 80. Motorized Venetian shades 80 formed of any suitable size, shape and design. Motorized Venetian shades 80 are similar to motorized honeycomb shades 62 presented earlier. The substantial difference between motorized Venetian shades 80 and motorized honeycomb shades 62 is that the honeycomb-styled shade material 14 is replaced with a plurality of individual slats 82, that collectively form shade material 14. While these individual slats 82 are raised and lowered like honeycomb material 14 using suspension cords 64, these individual slats 82 are supported by a suspension ladder 84 which maintains their vertical spacing. Suspension ladder 84 also allows for tilting of the slats 82 to fine tune the amount of light that is allowed to pass through the shade material 14/slats 82.

Like motorized honeycomb shades 62, motorized Venetian shades 80 are configured to raise and lower the shade material 14 by deploying and retracting suspension cords 64 that extend through the shade material 14 and connect to bottom bar 16.

As one example, in the arrangement shown in FIG. 8, support 18 takes the form of an elongated headrail having a hollow interior 66 that houses a rotatable drive shaft 68 that is connected to a plurality of suspension cord spools 70 and spring housings 72 that house springs 74. As the drive shaft 68 rotates, so rotates the springs 74 within the spring housings 72 which generate a counterbalance force that counters the weight of the shade material 14 and bottom bar 16. As the drive shaft 68 rotates, so rotates the suspension cord spools 70, thereby raising or lowering the shade material 14 and bottom bar 16.

Motorized Venetian shades 80 also include tilt spools 86 that connect to the upper end of suspension ladders 84 and are configured to adjustably tilt the angle of slats 82 to adjust the amount of light that is transmitted through the shade material 14.

As one example, in the arrangement shown in FIG. 8, motor 20 and motor controller 22 of motorized Venetian shade 80 are positioned within the hollow interior 66 of headrail/support 18 and are housed within or as part of motor controller assembly 38, which may be configured similarly or identically to that shown with respect to motorized honeycomb shades 62. Also, in the arrangement shown, the power source 24 takes the form of a plurality of batteries 36 held by a battery holding section 76 of motor controller assembly 38.

In Operation: When motor 20 is activated by motor controller 22, motor 20 causes rotation of drive shaft 68. When drive shaft 68 is rotated in a first direction, shade material 14 and bottom bar 16 are raised as the suspension cords 64 wrap around the suspension cord spools 70, and the springs 74 provide a counterbalance force that compensates for the varying weight of the shade material 14 on suspension cords 64. When drive shaft 68 is rotated in a second direction, opposite the first direction, shade material 14 and bottom bar 16 are lowered as the suspension cords 64 unwrap around the suspension cord spools 70, and the springs 74 provide a counterbalance force that compensates for the varying weight of the shade material 14 on suspension cords 64. The angle of the slats 82 is similarly adjusted by rotation of the tilt spools 86 which causes tilting of the suspension ladder 84.

Figure 10:
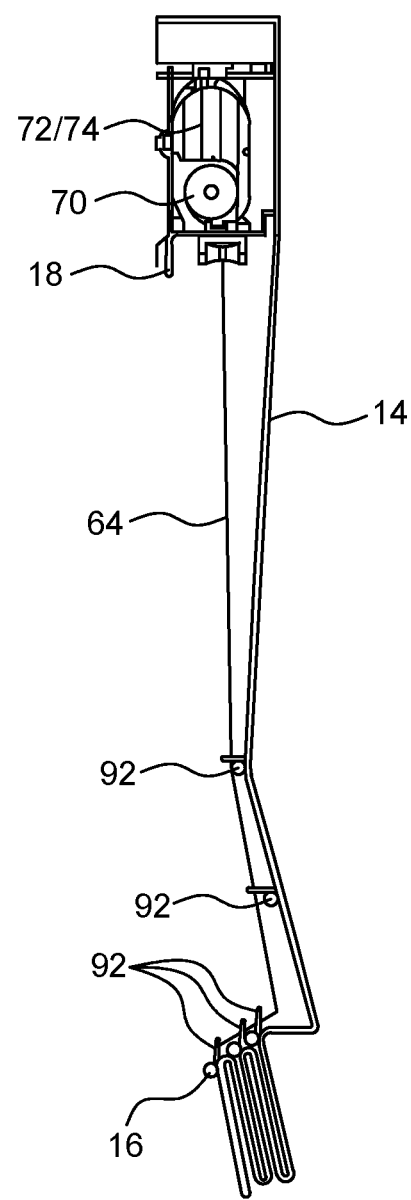
FIG. 10 is a side perspective view of one common form of a motorized window shade, a motorized Roman shade.
Figure 11:
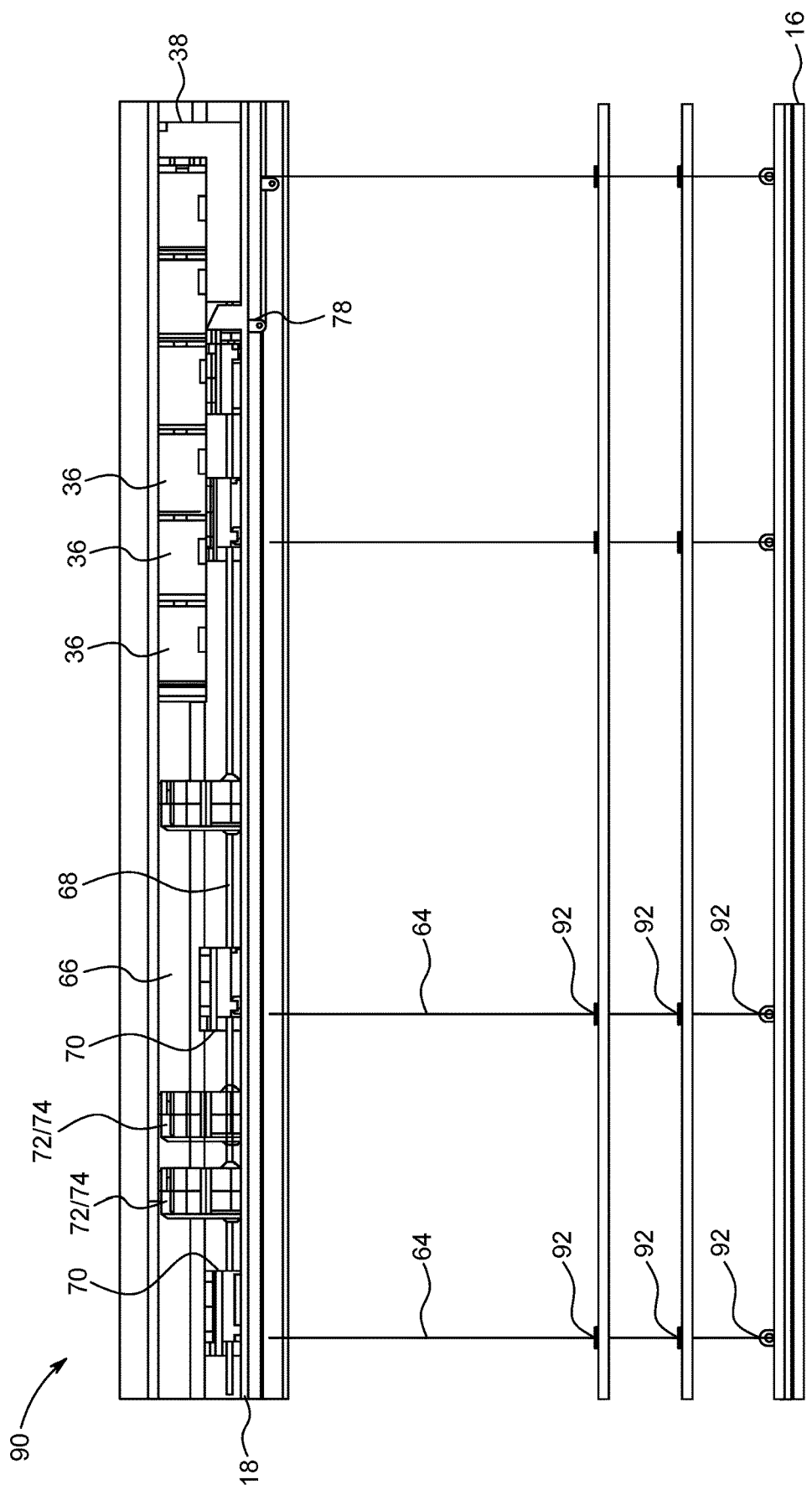
FIG. 11 is a front perspective view of one common form of a motorized window shade, a motorized Roman shade.

Motorized Roman Shades: With reference to FIGS. 10-11, one common form of motorized window shades 12 are known as motorized Roman shades 90. Motorized Roman shades 90 formed of any suitable size, shape and design. Motorized Roman shades 90 are similar to motorized honeycomb shades 62 presented earlier. The substantial difference between motorized Roman shades 90 and motorized honeycomb shades 62 is that the honeycomb-styled shade material 14 is replaced with a sheet of material that is connected to suspension cords 64 in iterative spacing by loops 92. As the shade material 14 is raised, the connection of these loops 92 causes the shade material 14 to fold into a plurality of sections or panels.

Like motorized honeycomb shades 62, motorized Roman shades 90 are configured to raise and lower the shade material 14 by deploying and retracting suspension cords 64 that extend through the shade material 14 and connect to bottom bar 16.

As one example, in the arrangement shown in FIGS. 10-11, support 18 takes the form of an elongated headrail having a hollow interior 66 that houses a rotatable drive shaft 68 that is connected to a plurality of suspension cord spools 70 and spring housings 72 that house springs 74. As the drive shaft 68 rotates, so rotates the springs 74 within the spring housings 72 which generate a counterbalance force that counters the weight of the shade material 14 and bottom bar 16. As the drive shaft 68 rotates, so rotates the suspension cord spools 70, thereby raising or lowering the shade material 14 and bottom bar 16.

As one example, in the arrangement shown in FIGS. 10-11, motor 20 and motor controller 22 of motorized Roman shade 90 are positioned within the hollow interior 66 of headrail/support 18 and are housed within or as part of motor controller assembly 38, which may be configured similarly or identically to that shown with respect to motorized honeycomb shades 62. Also, in the arrangement shown, the power source 24 takes the form of a plurality of batteries 36 held by a battery holding section 76 of motor controller assembly 38.

In Operation: When motor 20 is activated by motor controller 22, motor 20 causes rotation of drive shaft 68. When drive shaft 68 is rotated in a first direction, shade material 14 and bottom bar 16 are raised as the suspension cords 64 wrap around the suspension cord spools 70, and the springs 74 provide a counterbalance force that compensates for the varying weight of the shade material 14 on suspension cords 64. When drive shaft 68 is rotated in a second direction, opposite the first direction, shade material 14 and bottom bar 16 are lowered as the suspension cords 64 unwrap around the suspension cord spools 70, and the springs 74 provide a counterbalance force that compensates for the varying weight of the shade material 14 on suspension cords 64.

Motor Controller Assembly: Motor controller assembly 38 is formed of any suitable size, shape and design and is configured to operate the opening and closing of shade material 14. With reference to FIG. 4, motor controller assembly 38 is generally tubular in shape and includes battery tube section 34. With reference to FIG. 5, motor controller assembly 38 is also generally tubular in shape but does not have the battery tube section 34 and instead this configuration of motor control assembly 38 is powered by connection to an external battery attachment which is facilitated by lead 40.

With reference to FIGS. 6, 7 and 8, motor controller assembly 38 is non-tubular in shape. That is, motor 20 and gear assembly 21 are positioned adjacent to batteries 36. As one example, with reference to FIG. 7 the motor 20 is positioned laterally adjacent to battery holding section 76. As another example, with reference to FIG. 8, motor 20 is positioned vertically adjacent to battery holding section 76.

Figure 9:
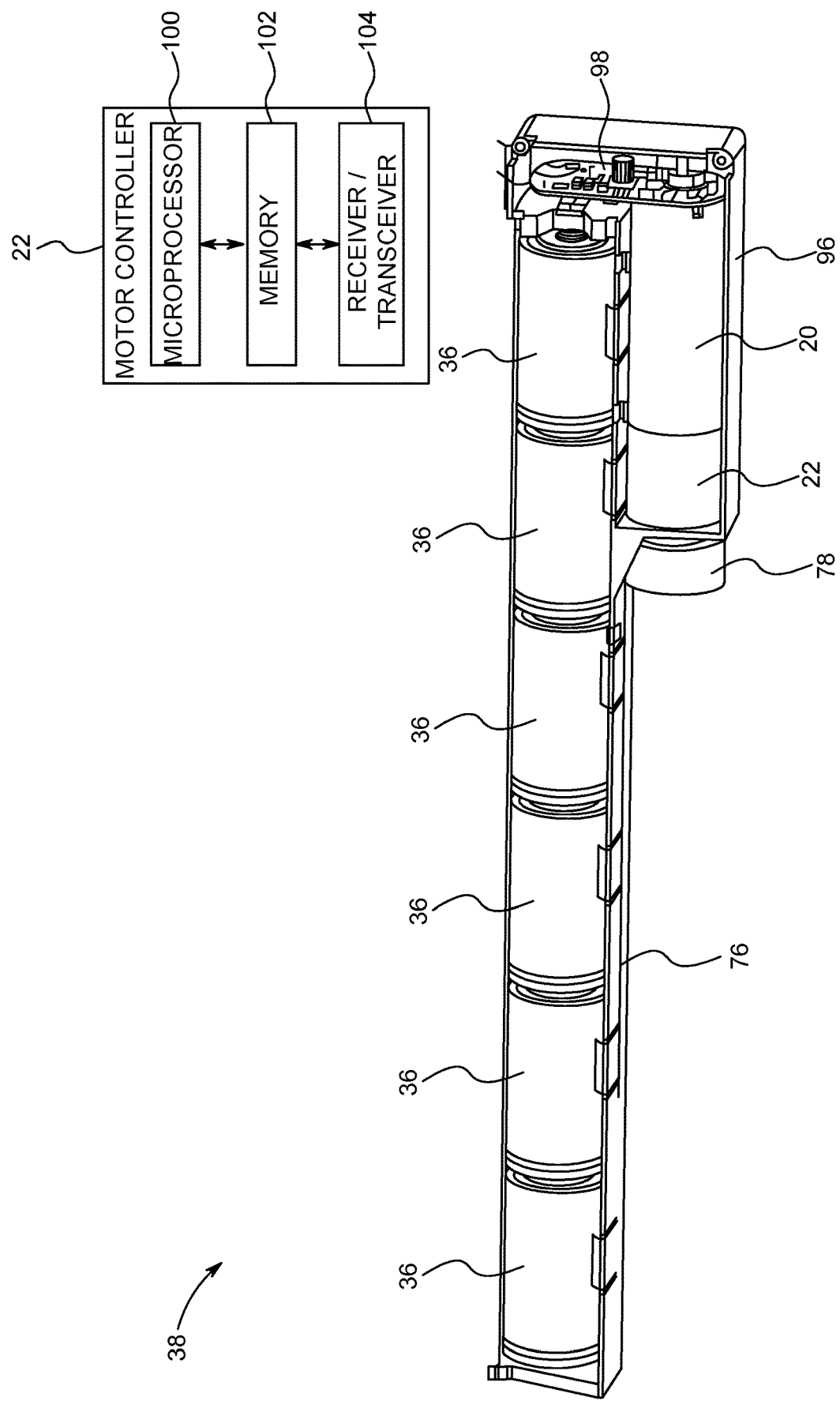
FIG. 9 is a side perspective view of a motor controller assembly which demonstrates that the motor and gear assembly are held within the motor controller housing, and a side perspective view of a printed circuit board (PCB)

With reference to FIG. 9, motor 20 and gear assembly 21 are held within motor controller housing 96. In this close up view of a motor controller assembly 38, the front cover of motor controller housing 96 is removed to show the motor 20 and gear assembly 21 therein. Also shown in this view is a printed circuit board (PCB) 98. PCB 98 contains and/or is electrically connected to most, if not all, of the electronic components needed to operate motorized window shade 12. These components include microprocessor 100, memory 102, receiver/transceiver 104 and antenna 44, among other components. PCB 98 electrically connects to power source 24 and motor 20.

Microprocessor 100 is any form of a computing device that receives information, processes it in accordance with instructions and information stored in memory 102 and outputs commands or control signals. Memory 102 is any form of a memory storage device that is configured to store information, instructions or data. In one arrangement, memory 102 is a separate component or components from microprocessor 100 whereas in another arrangement memory 102 is formed as a part of microprocessor 100.

Receiver/transceiver 104 is electrically connected to microprocessor 100 and antenna 44. Receiver/transceiver 104 is configured to transmit signals to and/or from microprocessor 100. When system 10 is a unidirectional system, meaning it only receives signals and acts upon them, receiver/transceiver 104 is merely a receiver configured to direct signals received from antenna 44 to microprocessor 100 in a unidirectional manner. In this arrangement receiver/transceiver 104 acts merely as a receiver. When system 10 is a bidirectional system, meaning it only both receives signals and acts upon them as well as transmits signals, receiver/transceiver 104 is a transceiver because it is configured to both send and receive signals from antenna 44.

Obstruction Detection System: As stated herein, one problem with motorized window shades 12 is the inability to detect when an obstruction is present. This is especially true upon a closing or lowering operation of vertically opening motorized window shades 12.

Figure 12:
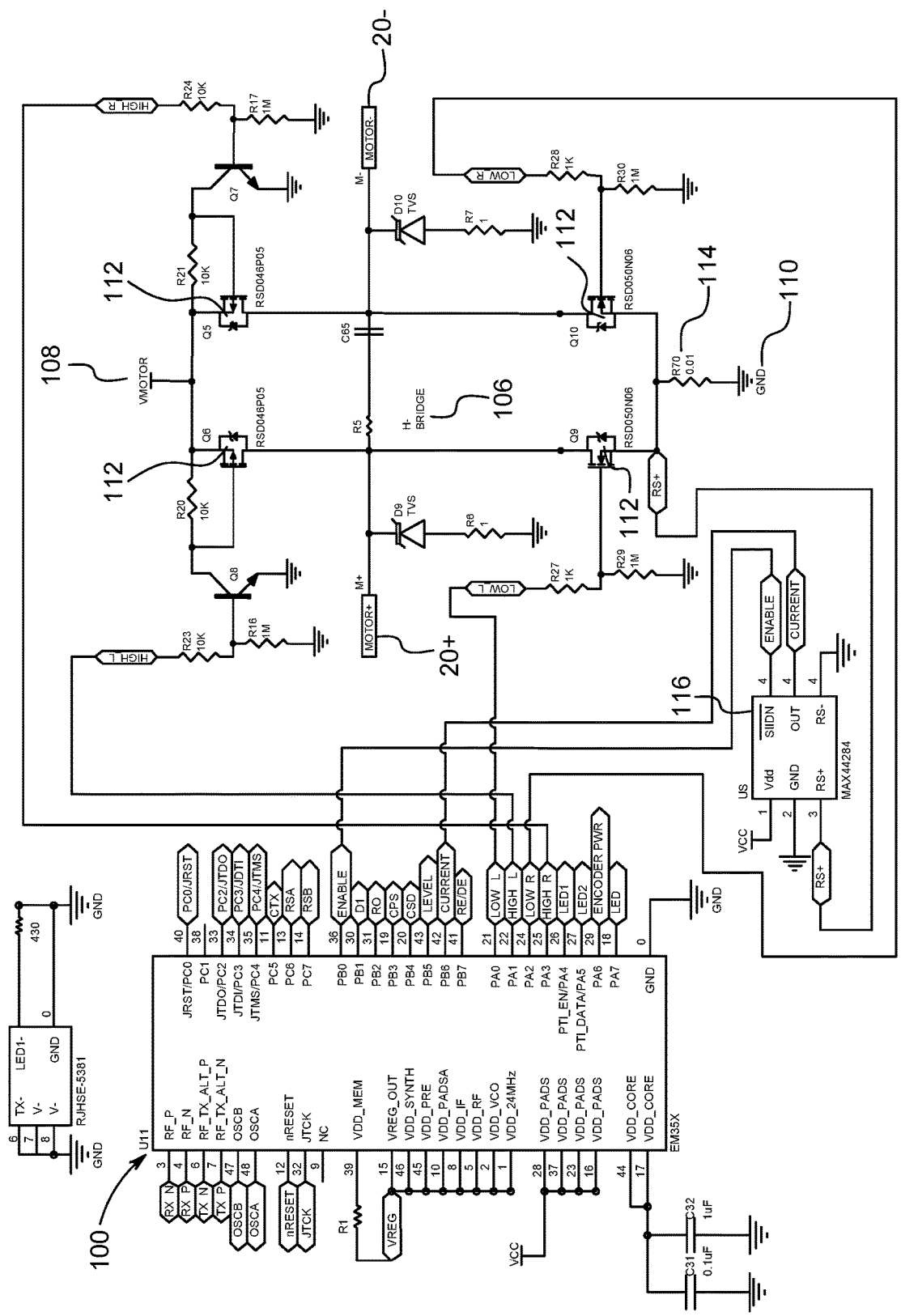
FIG. 12 is a plan view of one configuration of an obstruction detection system.
Figure 13:
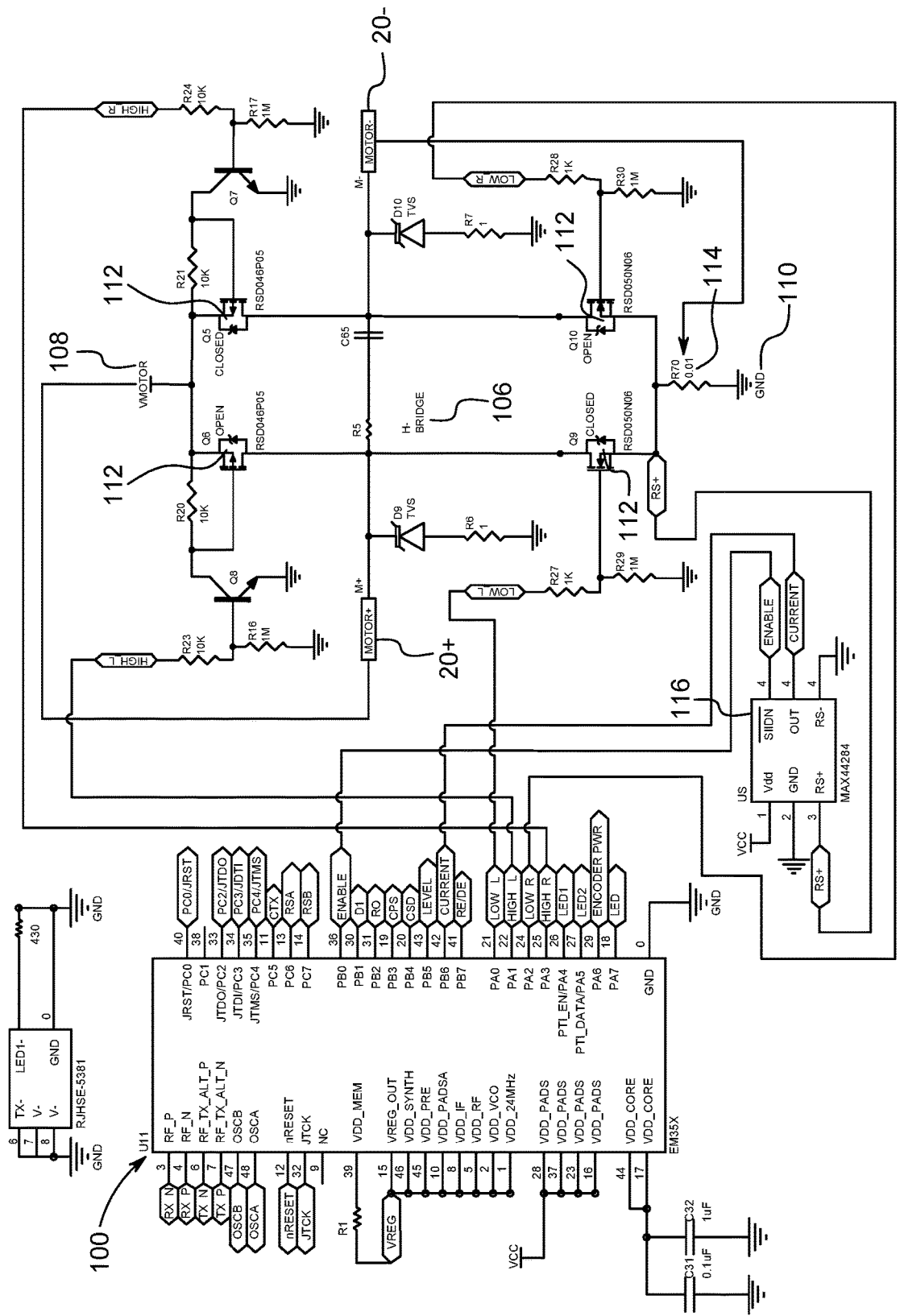
FIG. 13 is a plan view of one configuration of an obstruction detection system wherein the motor is shown rotating in a first direction as power flows through H-bridge through "OPEN" switches as power is prevented from passing through "CLOSED" switches.
Figure 14:
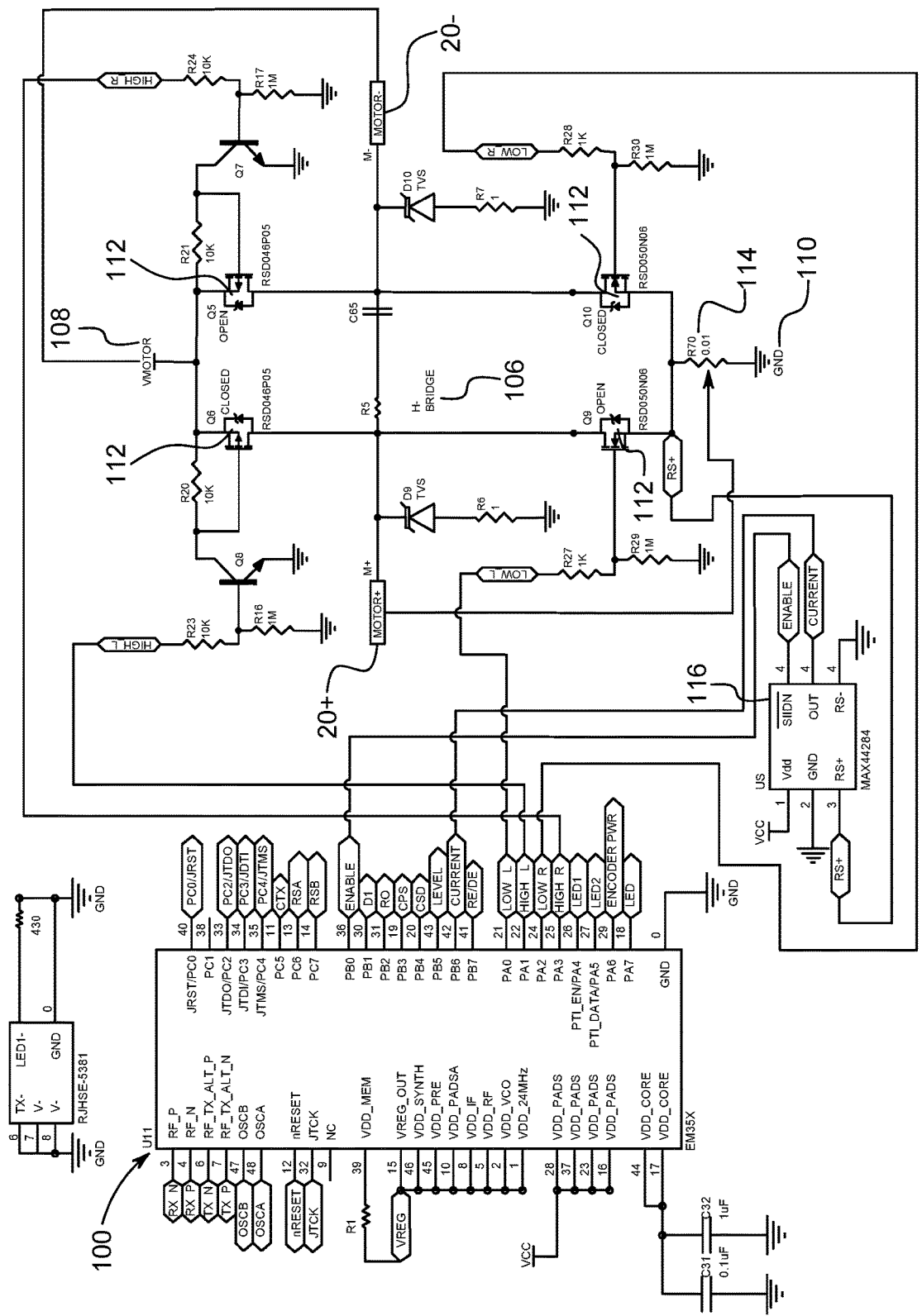
FIG. 14 is a plan view of one configuration of an obstruction detection system wherein the motor is shown rotating in a second direction, opposite the first direction, as power is prevented from passing through "CLOSED" switches.

With reference to FIG. 12, a plan view of one configuration of an obstruction detection system 10 is presented. In this arrangement, microprocessor 100 is electrically connected to an H-bridge 106 that is electrically connected to the positive lead 20+ of motor 20 and the negative lead 20− of motor 20. H-bridge 106 is any electronic circuit that enables a voltage to be applied across a load (in this case motor 20) in either direction (thereby controlling the rotational direction of motor 20). H-bridge 106 is electrically connected to a power-in 108 or positive electrical connection, and a ground 110 or negative electrical connection. H-bridge 106 includes a plurality of switches 112, also known as MOSFETs that open and close to provide power to the positive lead 20+ and negative lead 20− of motor 20. The term MOSFET is short for metal-oxide-semiconductor field-effect transistor (a/k/a MOSFET, MOS-FET, or MOS FET) a type of transistor used for amplifying or switching electronic signals. Depending on which switches 112 are open and which switches 112 are closed this controls whether the motor 20 is operating and the direction of rotation. Switches 112 can also be used electrically connect the positive lead 20+ of motor 20 to the negative lead 20− of motor 20 thereby applying a break, or using the motor 20 itself as a break. With reference to FIG. 13, motor 20 is shown rotating in a first direction as power flows through H-bridge 106 through "OPEN" switches 112 as power is prevented from passing through "CLOSED" switches 112. In contrast, with reference to FIG. 14, motor 20 is shown rotating in a second direction, opposite the first direction, as power is prevented from passing through "CLOSED" switches 112.

In this arrangement, a current sense resistor 114 and amplifier 116 are presented. In the arrangement shown, current sense resistor 114 is presented in electrical connection with H-bridge 106 and ground 110. Current sense resistor 114 is any form of a device that can be used to detect current flow or resistance, as is further described herein. Amplifier 116 is electrically connected to current sense resistor 114 and is configured to amplify the reading from current sense resistor 114 so that is more easily read by microprocessor 100. In the arrangement shown, amplifier 116 is electrically connected to the positive side and the negative side of current sense resistor 114 and with these readings the amplifier 116 creates a comparison, and outputs that comparison to the microprocessor 100. These readings from amplifier 116 are then compared to the prior readings from the amplifier 116 by microprocessor 100. If the reading or readings fall outside of a predetermined threshold, the microprocessor 100 is configured to identify that an obstruction has been detected and to stop the motor 20 from going further in the direction of the obstruction.

Current Sense Resistor: There are two types of current sensing: direct and indirect.

Indirect current sensing is based on Ampere's and Faraday's laws. By placing a coil (for instance Rogowski coil) around a current-carrying conductor, a voltage is induced across the coil that is proportional to the current. This allows for a non-invasive measurement where the sensing circuitry is not electrically connected to the monitored system. Since there is no direct connection between the sensing circuitry and the system, the system is inherently isolated. Indirect current sensing typically is used for load currents in the 100 A-1000 A range. This type of sensing, however, requires relatively expensive sensors and is not conducive to sensing currents on a PCB 98.

Direct current sensing is based on Ohm's law. By placing a shunt resistor in series with the system load, a voltage is generated across the shunt resistor that is proportional to the system load current. The voltage across the shunt can be measured by differential amplifiers such as current shunt monitors (CSMs), operational amplifiers (op amps), difference amplifiers (DAs), or instrumentation amplifiers (IAs). This method is an invasive measurement of the current since the shunt resistor and sensing circuitry are electrically connected to the monitored system. Therefore, direct sensing typically is used when galvanic isolation is not required. The shunt resistor also dissipates power, which may not be desirable. Direct current sensing typically is implemented for load currents <100 A. The remainder of this particular article series will focus on direct current sensing.

Input common-mode voltage: Input common-mode voltage is the most important specification when selecting a direct current sensing solution. It is defined as the average voltage present at the input terminals of the amplifier.

This specification is important because it limits our choice of differential amplifiers. For example, op amps and IAs require an input common-mode voltage within their power supplies. Difference amplifiers and CSMs, however, typically can accommodate input common-mode voltages in excess of their power supplies. This is useful in applications where the amplifier senses the shunt voltage in the presence of a large common-mode voltage and must interface with a low-voltage analog-to-digital converter (ADC). In such a scenario the amplifier and ADC can be powered with the same supply voltage regardless of the system's common-mode voltage.

High-side versus low-side current sensing: When monitoring load current the current sense resistor may be placed either between the supply voltage and load, or between the load and ground. The former is called high-side sensing whereas the latter is called low-side sensing.

Low-side sensing is desirable because the common-mode voltage is near ground, which allows for the use of single-supply, rail-to-rail input/output op amps. The drawbacks to low-side sensing are disturbances to the system load's ground potential and the inability to detect load shorts.

High-side sensing is desirable in that it directly monitors the current delivered by the supply, which allows for the detection of load shorts. The challenge is that the amplifier's input common-mode voltage range must include the load's supply voltage. This requirement frequently necessitates the use of DAs or dedicated CSMs, which allow for common-mode voltages outside their voltage supply range.

In the arrangement shown, the current sense resistor 114 is positioned between the load (H-bridge 106/motor 20) and ground 110 and therefore the arrangement shown is low-side sensing. However, a high-side sensing arrangement is hereby contemplated for use by positioning the current sense resistor 114 between the power-in 108 and the load (H-bridge 106/motor 20).

Obstruction Detection—In Operation: In one arrangement, when motorized window shade 12 is operating, a voltage reading is taken from the top and bottom (or positive and negative) sides of the current sense resistor 114. These readings are transmitted to the amplifier 116. The amplifier 116 compares the two readings from either side of the current sense resistor 114 and produces a comparison value. This comparison value is then amplified, or multiplied, by a set amount to amplify the reading from the current sense resistor 114 to a level that is readable by the microprocessor 100.

As one example, the current sense resistor 114 is a Bourns Inc. CRF0805-FX-R010ELF, which is a surface mount 0.01 ohm resistor with a 1% tolerance and a ½ Watt rating. However, any form of a current sense resistor is hereby contemplated for use. The input into amplifier 116 may be in the range of 0 volts to upwards of 50 to 60 millivolts mV. The amplifier 116 receives the readings from the positive and negative side of the current sense resistor 114 and compares them to one another. As an example, if the reading on one side of the current sense resistor 114 is 0 volts and the reading on the other side of the current sense resistor 114 is 1.5 volts, the comparison value would be 1.5 volts-0 volts=1.5 volts, or 0 volts-1.5 volts=−1.5 volts. The resulting comparison is presented as a straight voltage.

The amplifier 116 then amplifies this reading by a set amount to raise the relatively low (low voltage) reading from the current sense resistor 114 to a level that is easily readable by the microprocessor 100. As one example, the amplifier 116 multiplies the comparison from the current sense resistor 114 by 50 times, 100 times, 150 times, 200 times, or the like, or any other amount. Generally speaking, output from the amplifier 116 is between 0 volts and 3.3 volts to be compatible with the demands of microprocessor 100.

Microprocessor 100 includes an Analog-to-Digital Converter (ADC). The ADC of the microprocessor 100 receives the output comparison signals from the amplifier 116 continuously for a sampling period. A sampling period is a predetermined period of time, such as a millisecond, two milliseconds, three milliseconds, or the like, where the ADC of microprocessor 100 receives the output comparison voltage from the amplifier 116. The ADC averages these readings from the amplifier 116 over the sampling period and outputs an average reading for that sampling period, a/k/a the current sampling period reading.

Once the current sampling period reading is determined, the process repeats itself and the a new current sampling period reading is generated. The prior current sampling period reading is then stored for comparison purposes. In one arrangement some, all or any amount of readings are compared, averaged or mathematically analyzed or manipulated in any way according to an algorithm to improve sensitivity and accuracy of the system 10 and to eliminate false positives (e.g. determining that an obstruction is present when no obstruction is present).

Once the ADC of the microprocessor 100 receives the current sampling period reading, the microprocessor 100 then compares the current sampling period reading to the prior performance of the motorized window shade. If the current sampling period reading falls outside of predetermined parameters according to an algorithm or instructions, the current sampling period reading is flagged and this is interpreted as an obstruction has been encountered by the bottom bar 16.

Again, the information detected by current sense resistor 114, amplifier 116 and microprocessor 100 may be used in any way to determine whether an obstruction is present.

No Averaging: In one arrangement, the current sampling period reading is compared to the immediately prior sampling period reading. If this direct comparison reveals that the current sampling period reading is outside of predetermined limits (such as 10% above or 10% below) microprocessor 100 determines that an obstruction has been detected. While effective, this method has the tendency to be insensitive or overly sensitive as there is no accounting for temporary spikes which may occur for any number of reasons.

Averaging: In one arrangement, to smooth the operation of the system 10, averaging of the readings can be harnessed in any way to eliminate outliers, temporary spikes and erroneous readings.

As one example, all current sampling period readings are averaged for the current movement of the motorized window shade 12. Then, the current sampling period reading is compared directly to this average of all current sense readings for the current movement. If the current sampling period reading falls outside of predetermined parameters (such as 10% above or 10% below) the microprocessor 100 determines that an obstruction is present. This arrangement provides the benefit of smoothing the readings for that particular movement of the shade. However, this arrangement is susceptible to false positives because only one current sampling period reading is being compared to the average reading for that movement.

As another example, to further eliminate spikes, false positives and the like, instead of simply comparing the most recent current sampling period reading to the average of all current sampling period readings for that movement of the motorized window shade 12 a plurality of current sampling period readings are compared or averaged and then this value is compared to the average of all current sampling period readings for that movement of the motorized window shade 12. This arrangement provides the benefit of smoothing the readings for that particular movement of the shade, as well as smoothing the current sampling period reading. Any number of current sampling period readings can be combined for comparison to the average of all current sampling period readings for that movement of the motorized window shade 12 such as two readings, three readings, four readings, five readings, ten readings, a hundred readings or a thousand readings or any number there between.

As yet another, instead of combining all of the current sampling period readings into a single average of all current sampling period readings for that movement of the motorized window shade 12, limits are placed on the number of current sampling period reading that are used to generate this value. This provides benefits when certain portions of the opening-closing process have different characteristics. That is, if a beginning portion of an opening-closing process is noisier than the latter portion of the opening-closing process, the system may lose sensitivity if all readings are combined. As such, sensible limits are placed on this averaging function, and once the number of readings is exceeded new values are added as the oldest values are removed.

By restarting the average that the current sampling period reading is compared to for each movement of the motorized window shade 12, this provides greater accuracy of detecting a bottom bar 16 obstruction because the values used to determine whether an obstruction is present are specific to that specific movement and there is no carryover from prior performance of the motorized window shade 12. This provides and advantage because both the long-term dynamics and the near-term dynamics of operation of the motorized shade may change substantially. As such, if detection of an obstruction is dependent of the prior performance of the motorized window shade 12 this may lead to less sensitivity or excessive false positives.

Long-term dynamics of the motorized window shade 12 that may change overtime include: the counterbalance force of the counterbalance assembly 50 can relax, springs can break, gears in the gear assembly 21 can wear, the efficiency of the motor 20 can change, the dynamics of the shade material 14 change, the power from the power source 24 may ebb and flow, among others. Near-term dynamics of the motorized window shade 12 that may change within a very short period of time include: temperature changes, whether sunlight started shining or stopped shining on the motorized window shade 12, how frequently the motorized window shade 12 has moved recently, among others. Limiting the comparison values to the present movement of the motorized window shade 12 eliminates any movement-to-movement variables that are present thereby providing greater sensitivity and accuracy.

Obstruction Detection Examples: As examples, an obstruction may be determined to exist using the following simplified Compare current sampling period reading to immediately prior sampling period reading>Predetermined Value=Obstruction detected.

Compare current sampling period reading to average of all readings for that movement>Predetermined Value=Obstruction detected.

Compare X number of the most current sampling period readings to immediately prior sampling period reading>Predetermined Value=Obstruction detected.

Compare X number of the most current sampling period readings to average of all readings for that movement>Predetermined Value=Obstruction detected.

Compare X number of the most current sampling period readings to X number of the most current sampling period readings>Predetermined Value=Obstruction detected.

These are merely examples of how averaging can be used to smooth operation of the system 10. Any form of averaging is hereby contemplated for use. Similarly any form of an algorithm may be used to eliminate erroneous readings and smooth operation of the system 10 while providing optimal sensitivity.

Response to Obstruction: In the event an obstruction has been detected according to the instructions and algorithms and sampling used by the microprocessor 100, the microprocessor 100 may be configured to respond in any number of ways.

As one example, the microprocessor 100 may be configured to stop the lowering of the bottom bar 16 when an obstruction is detected.

As another example, the microprocessor 100 may be configured to stop the lowering of the bottom bar 16 when an obstruction is detected followed by raising the bottom bar a predetermined distance.

As yet another example, the microprocessor 100 may be configured to stop the lowering of the bottom bar 16 when an obstruction is detected followed by raising the bottom bar 16 to an open position.

As yet another example, the microprocessor 100 may be configured to stop the lowering of the bottom bar 16 when an obstruction is detected followed by raising the bottom bar 16 either to an open position or a predetermined amount. Once the bottom bar 16 has been raised after an obstruction has been detected a first time, the microprocessor 100 is configured to re-lower the bottom bar 16. If, in the event an obstruction is detected a second time, the microprocessor 100 is configured to either stop the lowering of the bottom bar 16 and leave it there, raise the bottom bar 16 to the open position, or raise the bottom bar 16 a predetermined amount. While in this example the microprocessor 100 is configured to stop operation after a second detection of an obstruction, the microprocessor 100 may be configured to attempt any number of lowering movements such as three, four, five, six or more before finally ceasing operation.

On subsequent attempts to lower the bottom bar 16 after an obstruction has been detected, the microprocessor 100 may be configured to increase the sensitivity of obstruction detection. On subsequent attempts to lower the bottom bar 16 after an obstruction has been detected, the microprocessor 100 may also be configured to slow the speed of lowering the bottom bar 16 to help increase the sensitivity of obstruction detection.

Using System 10 To Set Limits of Operation: When purchasing or ordering motorized window shades 12 the desired dimensions of the motorized window shade 12 are required. While the width dimensions are often very precisely specified, due to the raising and lowering nature of motorized window shades 12 there is substantial flexibility in the vertical dimensions. That is, manufacturers of motorized window shades 12 often provide additional vertical length of shade material 14 as a safety factor. As such, upon installation of motorized window shades 12 the vertical limits of operation must be set.

Conventionally, after installing the motorized window shade 12 the installer is required to go through a set-up sequence. In this set-up sequence the installer moves the bottom bar 16 to the desired fully closed position. This fully closed position often corresponds with the position of an obstruction, such as a window sill, the bottom of a channel that the shade material 14 travels in, or the like. That is, for inside-mount motorized window shades 12 the window sill is the farthest the bottom bar 16 can travel. Once the bottom bar 16 is moved to this fully closed position, the microprocessor 100 is programmed to store that position in its memory 102. The microprocessor 100 is then configured to return to that stored position when the motorized window shade 12 is instructed to move to the closed position.

This installation and set-up process is often time consuming, inconvenient, complicated, intimidating to new users and not intuitive. In addition, in many situations it may be difficult to precisely set the desired fully closed position. To obviate these problems, ease the installation process and improve accuracy of setting the bottom bar 16 limit, the obstruction detection system 10 described herein is used to establish the bottom limit of the bottom bar 16 upon installation.

As one example, the obstruction detection system 10 is used to set the operational limits of the motorized window shade 12 in the following manner.

First, the installer installs the motorized window shade 12 in the space around the window.

Next, once installed, the installer activates the motorized window shade 12 for the first time. This may be accomplished by any manner, method or means. Examples include, plugging in the motorized window shade 12 for the first time, inserting batteries into the motorized window shade for the first time, removing an insulator strip positioned between a power source and the other electrical components of the motorized window shade 12, pressing a button on the motorized window shade, pressing a button on a remote or other wireless device that transmits a signal to the motorized window shade 12, or by any other manner, method or means.

Once activated, the motorized window shade 12 is programmed to seek out the fully closed position for bottom bar 16. In one arrangement, the motorized window shade 12 is programmed to automatically seek out the fully closed position for bottom bar 16 by moving downward upon activation. In another arrangement, the motorized window shade 12 is programmed to seek out the fully closed position for bottom bar 16 when a close signal is transmitted for the first time to the motorized window shade 12, such as by pressing a down position button on a remote or other wireless device that is paired with the motorized window shade 12.

Once the initial close signal is transmitted to the motorized window shade 12, the microprocessor 100 recognizes that no close position is stored in the memory 102 of microprocessor 100. The microprocessor 100 controls the motor 20 to move in a downward direction until the microprocessor 100 detects that an obstruction has been encountered in any of the manners described herein. In one arrangement, to provide greater accuracy and assurance that the bottom bar 16 has reached the closed position, the microprocessor 100 may be programmed to detect the position of the obstruction two, three, four or more times and then average this position.

Once the position of the obstruction is detected, the microprocessor 100 may be programmed to set the closed position of the bottom bar 16 just slightly above the position of the obstruction, such as 1/32 of an inch, 1/16 of an inch, 1/8 of an inch, 1/4 of an inch or the like. This raising of the fully closed position of bottom bar 16 provides just a little bit of clearance for the bottom bar 16 so that it does not rattle or bump the window sill during use.

Over time, as the shade material 14 stretches or other dynamics of the motorized window shade 12 change, a previously set fully closed position of bottom bar 16 may be lost or may become inaccurate. To alleviate this problem, the obstruction detection system 10 is used over time to ensure that the fully closed position of bottom bar 16 remains accurate. That is, the microprocessor 100 is programmed to redefine the fully closed position of bottom bar 16 if an obstruction is detected over a predetermined number of movements or predetermined amount of time in the near-vicinity of the previously defined fully closed position. In this way, the system 10 is used to provide a self-healing or self-improving motorized window shade 12 that does not allow for bottom bar 16 drift over time.

In one arrangement, to ensure the accuracy of the previously set fully closed position of bottom bar 16, the microprocessor 100 is configured to re-define the fully closed position every predetermined number of cycles, such as 50 cycles, 100 cycles, 200 cycles or the like. In this way, again, the system 10 may be used to provide a self-healing or self-improving motorized window shade 12 that does not allow for bottom bar 16 drift over time.

In the event that the installation is an outside-mount application, where there is no window sill for the bottom bar 16 to engage in a fully closed position, the installer may simply place another object, or use their hand, to serve as the obstruction when setting the operational limits of the motorized window shade.

Obstruction Reporting: The safety and security of one's home is of utmost importance. With the ability to accurately detect an obstruction in the path of a motorized window shade 12 this may provide valuable insight into the security of one's home. That is, if an obstruction is detected, which is by its own definition unexpected, something is not as it should and this may provide insight into the security of the home or building.

As such, in the arrangement wherein motorized window shade 12 is configured to have two-way communication, that is, the motorized window shade 12 both sends and receives signals using receiver/transceiver 104, which in this case would be a transceiver, when an obstruction is detected by the system 10 as is described herein, the motorized window shade 12 transmits a signal through the transceiver of receiver/transceiver 104 informing a central processing system 120 such as an alarm system, a home automation system or the like that an obstruction has been unexpectedly detected during a closing operation. This signal may be transmitted through the internet, the cloud or another electronic network to a cell phone or other handheld device to inform the owner of the unexpected obstruction. The owner can then inspect the property to determine what the issue is.

In this way, detecting a bottom bar obstruction and reporting that obstruction improves safety as the owner is quickly informed of the issue and they can inspect the property to assess what the issue is, and if there is an issue, they can quickly resolve it. This is particularly helpful in large properties where there are portions that are not often visited.

Accordingly, from the above discussion it will be appreciated that the obstruction detection system for motorized window shades 10 presented: improves upon the present state of the art; protects the shade material 14; improves safety; prevents damage to the environment surrounding the motorized window shades 12; improves the use of motorized window shades 12; extends the useful life of motorized window shades 12; is easy to use; is safe to use; is inexpensive; improves the functionality of motorized window shades 12; is convenient to use; is easy to install; does not require additional exterior parts; is energy efficient; has a simple design; has a minimum number of parts; has a rugged design; is relatively foolproof; is sensitive; has an intuitive design; can be connected to a security system or home automation system; can be utilized in two-way communication to report an obstruction; among countless other improvements and advantages.

It will be appreciated by those skilled in the art that other various modifications could be made to the device without parting from the spirit and scope of this invention. All such modifications and changes fall within the scope of the claims and are intended to be covered thereby.

What is claimed:

1. A motorized window shade system configured to detect when an obstruction is encountered, comprising:
   a motorized window shade;
   the motorized window shade having a motor; a microprocessor;
   the microprocessor electrically connected to the motor;
   the microprocessor configured to control operation of the motor;
   the motorized window shade having shade material;
   a bottom bar;
   the bottom bar connected to the shade material;
   wherein the motorized window shade is configured to raise the shade material and the bottom bar to an open position and lower the shade material and the bottom bar to a closed position;
   a current sense resistor electrically connected with the motor and the microprocessor;
   wherein the microprocessor monitors signals from the current sense resistor during operation of the motor;

wherein the microprocessor determines whether an obstruction has been encountered when a current reading from the current sense resistor exceeds a predetermined threshold;

wherein when an obstruction is detected while lowering the shade material and the bottom bar, the microprocessor stops lowering the shade material and the bottom bar.

2. The motorized window shade system of claim 1 further comprising an amplifier, the amplifier electrically connected to the current sense resistor and the microprocessor, wherein the amplifier amplifies the signal from the current sense resistor.

3. The motorized window shade system of claim 1 wherein the current sense resistor is positioned between the motor and ground in a low-side sensing arrangement.

4. The motorized window shade system of claim 1 wherein the current sense resistor is positioned between a power source and the motor in a high-side sensing arrangement.

5. The motorized window shade system of claim 1 wherein when the obstruction is detected while lowering the shade material and the bottom bar, the microprocessor raises the shade material and bottom bar after stopping the lowering of the shade material and the bottom bar.

6. The motorized window shade system of claim 1 wherein when an obstruction is detected the microprocessor transmits a signal reporting the presence of the obstruction.

7. A motorized window shade system configured to detect when an obstruction is encountered during a closing operation, comprising:

a motorized window shade;

the motorized window shade having a motor; a microprocessor;

the microprocessor electrically connected to the motor;

the microprocessor configured to control operation of the motor; the motorized window shade having shade material and a bottom bar;

wherein the motorized window shade is configured to raise the shade material and the bottom bar to an open position and lower the shade material and the bottom bar to a closed position;

a current sense resistor electrically connected with the motor and the microprocessor;

wherein the microprocessor receives signals from the current sense resistor during operation of the motor;

wherein the microprocessor conducts a comparison of current readings from the current sense resistor with prior readings from the current sense resistor;

wherein when the result of the comparison of current readings from the current sense resistor to prior readings from the current sense resistor exceeds a predetermined threshold, the microprocessor determines that an obstruction has been encountered by the bottom bar wherein when an obstruction is detected while lowering the shade material and the bottom bar, the microprocessor stops lowering the shade material and the bottom bar.

8. The motorized window shade system of claim 7 further comprising an amplifier electrically connected to the current sense resistor and the microprocessor, wherein the amplifier amplifies the signal from the current sense resistor.

9. The motorized window shade system of claim 7 wherein the current sense resistor is positioned between the motor and ground in a low-side sensing arrangement.

10. The motorized window shade system of claim 7 wherein the current sense resistor is positioned between a power source and the motor in a high-side sensing arrangement.

11. The motorized window shade system of claim 7 wherein when the obstruction is detected while lowering the shade material and the bottom bar, the microprocessor raises the shade material and bottom bar after stopping the lowering of the shade material and the bottom bar.

12. The motorized window shade system of claim 7 wherein when an obstruction is detected the microprocessor transmits a signal reporting the presence of the obstruction.

13. A method of sensing an obstruction in the motorized window shade of claim 1, the steps comprising:

providing the motorized window shade having the motor and the microprocessor configured to operate the motor;

providing the current sense resistor in electrical connection with the motor and the microprocessor;

receiving the signals by the microprocessor from the current sense resistor during operation of the motor;

comparing the signals received by the microprocessor from the current sense resistor;

detecting whether an obstruction has been encountered when the shade material and the bottom bar is being lowered.

14. The method of claim 13, further comprising a step of providing an amplifier in electrical connection with the current sense resistor and the microprocessor.

15. A method of setting operational limits of the motorized window shade of claim 1, the steps comprising:

installing the motorized window shade having the motor, the shade material, the bottom bar, and the microprocessor configured to operate the motor;

providing the current sense resistor in electrical connection with the motor and the microprocessor;

lowering the shade material and bottom bar during a learn mode;

detecting that an obstruction has been encountered by the bottom bar while the shade material and the bottom bar is being lowered from signals received from the current sense resistor;

setting a bottom limit based upon the location of the detected obstruction.

16. The method of claim 15, further comprising a step of providing an amplifier in electrical connection with the current sense resistor and the microprocessor.

17. The method of claim 15, wherein the obstruction is a window sill.

\* \* \* \* \*